(12) United States Patent
Min et al.

(10) Patent No.: US 8,315,309 B2
(45) Date of Patent: Nov. 20, 2012

(54) METHOD AND APPARATUS FOR ENCODING AND DECODING AN IMAGE BY USING CONSECUTIVE MOTION ESTIMATION

(75) Inventors: Jung-hye Min, Yongin-si (KR); Tammy Lee, Seoul (KR); Woo-jin Han, Suwon-si (KR); Hae-kyung Jung, Seoul (KR); Il-koo Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 12/329,945

(22) Filed: Dec. 8, 2008

(65) Prior Publication Data

US 2009/0225847 A1  Sep. 10, 2009

(30) Foreign Application Priority Data

Mar. 4, 2008  (KR) .................. 10-2008-0020071

(51) Int. Cl.
*H04N 11/04* (2006.01)
(52) U.S. Cl. .......... 375/240.16; 375/240.14; 375/240.15
(58) Field of Classification Search .................. None
See application file for complete search history.

(56) References Cited

U.S. PATENT DOCUMENTS

| | | | |
|---|---|---|---|
| 6,195,389 B1 | 2/2001 | Rodriguez et al. | |
| 7,120,196 B2 | 10/2006 | Yu et al. | |
| 7,263,224 B2 | 8/2007 | Wang et al. | |
| 7,986,733 B2 * | 7/2011 | Aggarwal et al. | 375/240.12 |
| 2001/0002922 A1 * | 6/2001 | Hayashi | 375/240.16 |
| 2003/0133501 A1 * | 7/2003 | Ueda et al. | 375/240.13 |
| 2006/0002471 A1 | 1/2006 | Lippincott et al. | |
| 2007/0092147 A1 | 4/2007 | Guionnet et al. | |
| 2007/0147507 A1 * | 6/2007 | Koto et al. | 375/240.16 |

FOREIGN PATENT DOCUMENTS

KR  100671871 B1  1/2007

OTHER PUBLICATIONS

Balle, et al., "Extended Texture Prediction for H.264/AVC Intra Coding", Image Processing, 2007. ICIP 2007. IEEE International Conference on, IEEE, PI, Sep. 1, 2007. pp. VI-93-VI-96 XP031158270, ISBN: 978-1-4244-1436-9.
Yu, et al., "New Intra Prediction using Intra-Macroblock Motion Compensation", Joint Video Team (JVT) of ISO/IEC MPEG & ITU-T VCEG(ISO/IEC JTC1/SC29/WG11 and ITU-T SG16 Q6), XX, XX, May 6, 2002, pp. 1-10, XP002324083.
Extended European Search Report issued on Mar. 22, 2011 in counterpart European Application No. 08873149.2.

* cited by examiner

*Primary Examiner* — Kaveh Abrishamkar
(74) *Attorney, Agent, or Firm* — Sughrue Mion, PLLC

(57) ABSTRACT

A method and apparatus for encoding and decoding an image. The method of encoding an image includes generating a prediction block of a current block of a current image by performing continuous motion estimation, and encoding the current block based on the generated prediction block. The current block can be more precisely predicted so that the compression rate of image encoding is improved.

28 Claims, 9 Drawing Sheets

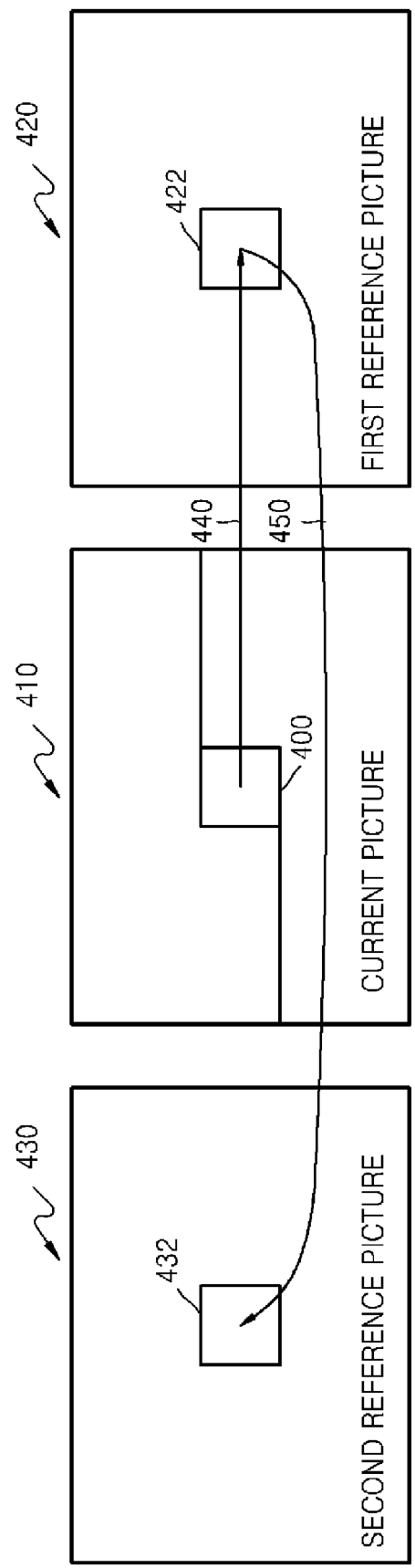

METHOD AND APPARATUS FOR ENCODING AND DECODING AN IMAGE BY USING CONSECUTIVE MOTION ESTIMATION

CROSS-REFERENCE TO RELATED PATENT APPLICATIONS

This application claims priority from Korean Patent Application No. 10-2008-0020071, filed on Mar. 4, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to a method and apparatus for encoding and decoding an image based on a result of prediction by more precisely predicting a current block by performing consecutive motion estimation a plurality of times.

2. Description of the Related Art

In image compression methods such as Moving Picture Experts Group-1 (MPEG-1), MPEG-2 or MPEG-4 H.264/MPEG-4 AVC (Advanced Video Coding), one picture is divided into predetermined image processing units so as to encode an image. Then, each image processing unit is encoded using inter prediction or intra prediction. Here, image processing units may be macro blocks. An optimum encoding mode is selected by considering the size of data and the degree of distortion of an original macro block, and an image processing unit is encoded according to the selected encoding mode.

In a method of encoding an image using inter prediction, temporal redundancy between pictures is removed and an image is compressed. A motion estimation encoding method is a representative method of encoding an image by using inter prediction.

In the motion estimation encoding method, motion of a current block is estimated using at least one reference picture, motion compensation is performed according to the result of motion estimation, and an image is encoded. In the motion estimation encoding method, the most similar reference block to the current block is searched within a predetermined range of reference pictures by using a predetermined evaluation function. A block having the smallest sum of absolute differences (SAD) with the current block is searched as a reference block. The reference block is an inter prediction block of the current block, and only a residual block obtained by subtracting the reference block from the current block is encoded and transmitted, thereby increasing the compression rate of data. Here, the current block may be formed to have various sizes such as 16×16, 8×16, 8×8, and 4×4 etc, which will now be described in detail with reference to FIG. 1.

FIG. 1 illustrates a conventional inter prediction method.

Referring to FIG. 1, when an image is encoded or decoded, inter prediction is preformed using at least one reference picture.

When a current block 112 of current picture 110 is inter predicted, an apparatus for encoding an image searches a prediction block 122 having the smallest SAD with the current block by searching a reference picture 120.

If the prediction block 122 is found, the prediction block 122 is subtracted from the current block 112 to generate a residual block. Then, the generated residual block is encoded to generate a bitstream. In this case, a motion vector 130, which is a relative difference between the position of the current block and the position of the prediction block 122 inside a picture, is encoded and inserted into the bitstream. Since only the residual block is transmitted, as the prediction block 122 is more similar to the current block 112, the compression rate of image encoding is improved.

However, the prediction block 122 having the smallest SAD with the current block 112 may exist in a previously encoded region of the current picture 110 (instead of in the reference picture 120). In particular, this occurs when a current picture includes an image in which a uniform pattern is repeatedly formed, as in an image depicting a texture. In this case, prediction encoding may be performed using a block included in the previously encoded region of the current picture 110.

An algorithm for removing such redundancy inside a picture has been suggested. However, prediction of a motion vector may be incorrect, and therefore the compression rate of image encoding is not greatly improved. Thus, a method and apparatus for encoding an image based on a more precise prediction block generated as a result of more effectively referring to a plurality of pictures including a current picture, are needed.

SUMMARY OF THE INVENTION

The present invention provides a method and apparatus for encoding and decoding an image by more precisely predicting a current block from a plurality of pictures including a current picture.

The present invention also provides a computer readable recording medium in which a program for executing the method is recorded.

According to an aspect of the present invention, there is provided a method for encoding an image, the method including: generating a prediction block of a current block by performing continuous motion estimation; and encoding the current block based on the generated prediction block.

According to another aspect of the present invention, there is provided a method for encoding an image, the method including: searching a first reference picture using a current block of a current picture and generating a first prediction block based on a result of the searching the first reference picture; searching a second reference picture using the generated first prediction block and generating a second prediction block based on a result of the searching the second reference picture; and encoding the current block based on at least one of the first prediction block and the second prediction block.

According to another aspect of the present invention, there is provided a method for encoding an image, the method including: searching a first reference picture using a current block of a current picture and generating a first prediction block based on a result of the searching the first reference picture; searching a previously-encoded region of the current picture using the generated first prediction block and generating a second prediction block based on a result of the searching the previously encoded region using the generated first prediction block; searching the previously-encoded region of the current picture using the current block and generating a third prediction block based on a result of the searching the previously encoded region using the current block; and encoding the current block based on at least one of the second prediction block and the third prediction block.

According to another aspect of the present invention, there is provided a method for decoding an image, the method including: generating a prediction block of a current block by performing continuous motion estimation; and restoring the current block by adding a residual block of the current block to the generated prediction block.

According to another aspect of the present invention, there is provided a method for decoding an image, the method including: searching a first reference picture using a motion picture of a current block of a current picture and generating a first prediction block based on a result of the searching the first reference picture; searching a second reference picture using the generated first prediction block and generating a second prediction block based on a result of the searching the second reference picture; and restoring the current block by adding at least one of the first prediction block and the second prediction block to a residual block of the current block.

According to another aspect of the present invention, there is provided a method for decoding an image, the method including: searching a first reference picture using a motion picture of a current block of a current picture and generating a first prediction block based on the results of the searching the first reference picture; searching a previously-decoded region of the current picture using the generated first prediction block and generating a second prediction block based on the results of searching the previously decoded region of the current picture using the generated first prediction block; searching the previously-decoded region of the current picture using a difference vector between a motion vector that is generated based on motion estimation of the second prediction block and a motion vector that is generated based on motion estimation of the third prediction block to generate a third prediction block; and restoring the current block by adding the third prediction block to a residual block of the current block.

According to another aspect of the present invention, there is provided an apparatus for encoding an image, the apparatus including: a predicting unit generating a prediction block of a current block by performing continuous motion estimation; and an encoding unit encoding the current block based on the generated prediction block.

According to another aspect of the present invention, there is provided an apparatus for encoding an image, the apparatus including: a predicting unit that searches a first reference picture using a current block of a current picture to generate a first prediction block and that searches a second reference picture using the generated first prediction block to generate a second prediction block; and an encoding unit that encodes the current block based on at least one of the generated first prediction block and the generated second prediction block.

According to another aspect of the present invention, there is provided an apparatus for encoding an image, the apparatus including: a predicting unit that searches a first reference picture using a current block of a current picture to generate a first prediction block, that searches a previously-encoded region of the current picture using the generated first prediction block to generate a second prediction block, and that searches the previously-encoded region of the current picture using the current block to generate a third prediction block; and an encoding unit that encodes the current block based on at least one of the second prediction block and the third prediction block.

According to another aspect of the present invention, there is provided an apparatus for decoding an image, the apparatus including: a predicting unit generating a prediction block of a current block by performing continuous motion estimation; and a restoring unit that restores the current block by adding a residual block of the current block to the generated prediction block.

According to another aspect of the present invention, there is provided an apparatus for decoding an image, the apparatus including: a predicting unit that searches a first reference picture using a motion picture of a current block of a current picture to generate a first prediction block and that searches a second reference picture using the generated first prediction block to generate a second prediction block; and a restoring unit that restores the current block by adding at least one of the first prediction block and the second prediction block to a residual block of the current block.

According to another aspect of the present invention, there is provided an apparatus for decoding an image, the apparatus including: a predicting unit that searches a first reference picture using a motion vector of a current block of a current picture to generate a first prediction block, that searches a previously-decoded region of the current picture using the generated first prediction block to generate a second prediction block, and that searches the previously-decoded region of the current picture using a difference vector between a motion vector that is generated based on motion estimation of the second prediction block and a motion vector that is generated based on motion estimation of the third prediction block to generate a third prediction block; and a restoring unit that restores the current block by adding the third prediction block to a residual block of the current block.

According to another aspect of the present invention, there is provided a computer readable medium in which a program for executing the method and the apparatus for encoding and decoding an image is recorded.

BRIEF DESCRIPTION OF THE DRAWINGS

The above and other features of the present invention will become more apparent by describing in detail exemplary embodiments thereof with reference to the attached drawings in which:

FIG. 4 illustrates a prediction method according to another exemplary embodiment of the present invention;

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
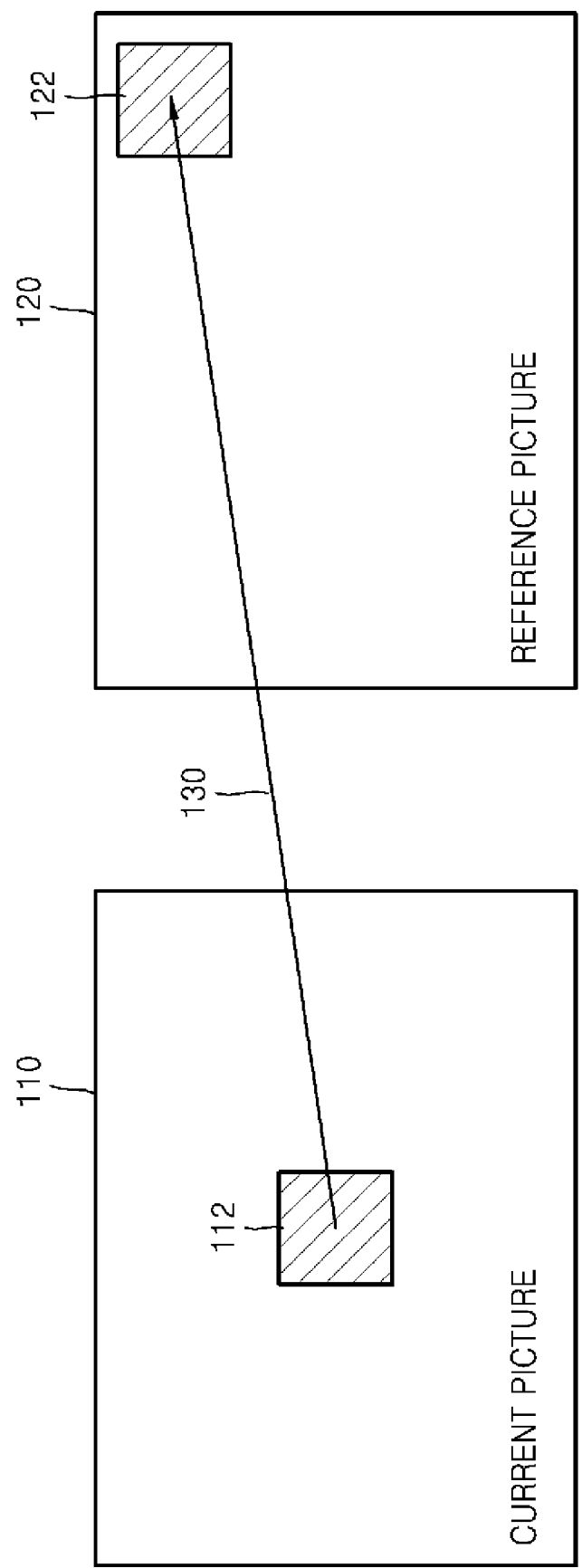
FIG. 1 illustrates a conventional inter prediction method.
Figure 2:
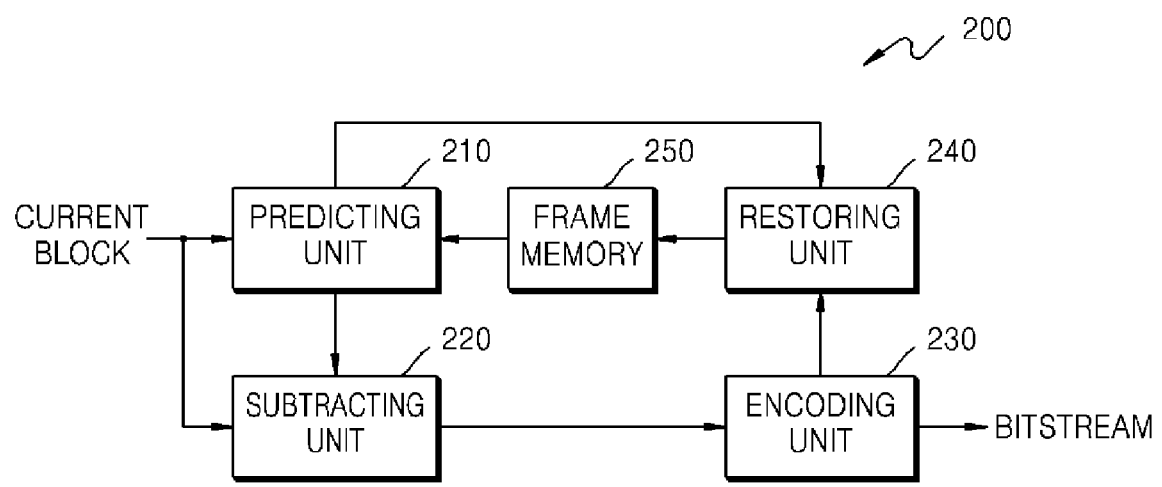
FIG. 2 illustrates a block diagram of an apparatus for encoding an image according to an exemplary embodiment of the present invention.

FIG. 2 illustrates a block diagram of an apparatus for encoding an image according to an embodiment of the present invention. Referring to FIG. 2, an apparatus 200 for encoding an image comprises a predicting unit 210, a subtracting unit 220, an encoding unit 230, a restoring unit 240, and a frame memory 250.

The predicting unit 210 predicts a current block by performing consecutive motion estimation a plurality of times by referring to at least one reference picture stored in the frame memory 250. The current block must be more precisely predicted as described previously with respect to the related art so that the compression rate of prediction encoding is improved. To this end, the current block must be predicted by referring to as many reference pictures as possible. However, as the number of referred to pictures increases, the amount of information to be additionally encoded increases and the compression rate of prediction encoding is not greatly improved.

For example, when inter prediction is performed by referring to two different pictures, two different motion vectors must be encoded. According to the present invention, in order to solve this problem, the amount of additional information is minimized by using consecutive motion estimation using a prediction block generated by performing motion estimation, and a current block is predicted by referring to a plurality of reference pictures, which will now be described in detail with reference to FIGS. 3, 4, 5A, and 5B.

Figure 3:
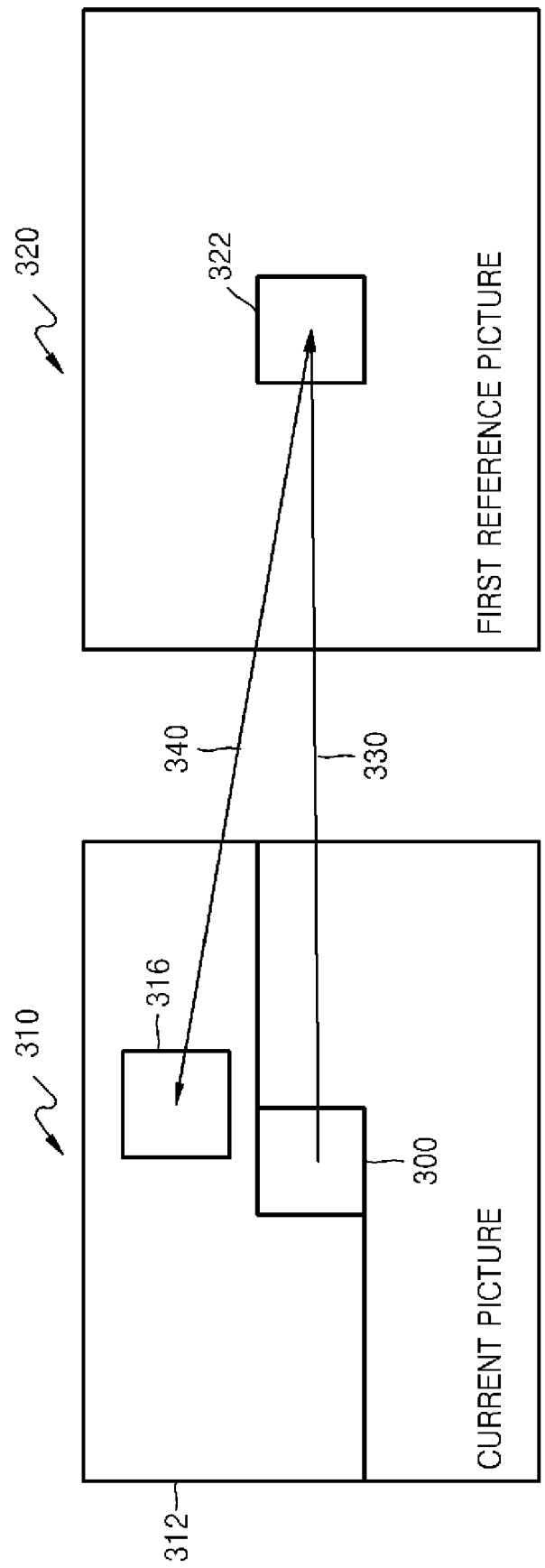
FIG. 3 illustrates a prediction method according to an exemplary embodiment of the present invention.

FIG. 3 illustrates a prediction method according to an embodiment of the present invention. Specifically, FIG. 3 illustrates a method of predicting a current block 300 of a current picture 310 by performing consecutive motion estimation.

The predicting unit 210 searches a first reference picture 320 so as to predict the current block 300 and to generate a first prediction block 322. The first prediction block 322 having a minimum sum of absolute differences (SAD) with the current block 300 is searched for in the first reference picture 320 by using the current block 300. As a result of first motion estimation, a first motion vector 330 is generated.

Next, in order to estimate consecutive motion, the predicting unit 210 searches a previously encoded region 312 of a current picture 310 by using the first prediction block 322 to generate a second prediction block 316. As a result of second motion estimation, a second motion vector 340 is generated. Since the second motion vector 340 is not additionally encoded as will be described later, there is no information to be additionally encoded except for the first motion vector 330.

As described previously with respect to the related art, when the current picture 310 includes a region in which the same pattern is repeatedly formed as in an image depicting a texture, an SAD of the second prediction block 316 included in a previously encoded region of the current picture 310 with the current block 300 may be smaller than that of the first prediction block 322 with the current block 310. If the second prediction block 316 is searched for and encoded directly using the current block 300, a motion vector indicating a relative position difference between the current block 300 and the second prediction block 316 must be separately encoded. However, such a motion vector that represents a position difference between blocks inside a picture is not easily predicted, and thus a large number of bits are used for encoding.

On the other hand, the first motion vector 330 can be easily predicted by using a conventional motion estimation method, and thus the compression rate of encoding is high. Thus, the predicting unit 210 performs motion estimation according to the related art, generates the first prediction block 322 and the first motion vector 330, and generates the second prediction block 316 and the second motion vector 340 using the first prediction block 322. Alternatively, the second prediction block 316 and the second motion vector 340 may be generated using the first prediction block 322 without an additional motion vector.

The predicting unit 210 generates a final prediction block of the current block 300 by using at least one of the first prediction block 322 and the second prediction block 316. The first prediction block 322 or the second prediction block 316 may also be a final prediction block. Alternatively, a final prediction block may also be generated by calculating weights of the first prediction block 322 and the second prediction block 316.

For example, if the first prediction block 322 is P1 and the second prediction block 316 is P2, when the weight of the first prediction block 322 is W1 and the weight of the second prediction block 316 is W2, a final prediction block PF may be calculated as $PF = W1 \times P1 + W2 \times P2$, where W1 and W2 satisfy the equation $W1 + W2 = 1$.

FIG. 4 illustrates a prediction method according to another embodiment of the present invention. Specifically, FIG. 4 illustrates a method of predicting the current block 400 of the current picture 410 by performing continuous motion estimation.

Referring to FIG. 4, the predicting unit 210 searches a first reference picture 420 so as to predict a current block 400 of current picture 410 and to generate a first prediction block 422. The first prediction block 422 having a minimum SAD with the current block 400 is searched for in the first reference picture 420 using the current block 400. As a result of first motion estimation, a first motion vector 440 is generated.

Then, in order to perform continuous motion estimation, the predicting unit 210 searches a second reference picture 430 using the first prediction block 422 to generate a second prediction block 432. As a result of second motion estimation, a second motion vector 450 is generated. As illustrated in FIG. 3, since the second motion vector 450 is not separately encoded, there is no additionally-encoded information except for the first motion vector 440. The only difference between FIG. 3 and FIG. 4 is that a previously encoded region of the current picture 410 is not searched, but the second reference picture 430 is searched for second motion prediction.

An SAD of the second prediction block 432 included in the second reference picture 430 with the current block 400 may be smaller than an SAD of the first prediction block 422 with the current block 400. Thus, the second prediction block 432 is searched for in the second reference picture 430 by performing continuous motion estimation.

The predicting unit 210 generates a final prediction block of the current block 400 by using at least one of the first prediction block 422 and the second prediction block 432, as illustrated in FIG. 3. The first prediction block 422 or the second prediction block 432 may also be a final prediction block. Alternatively, a final prediction block may also be generated by calculating weights of the first prediction block 422 and the second prediction block 432.

Figure 5A:
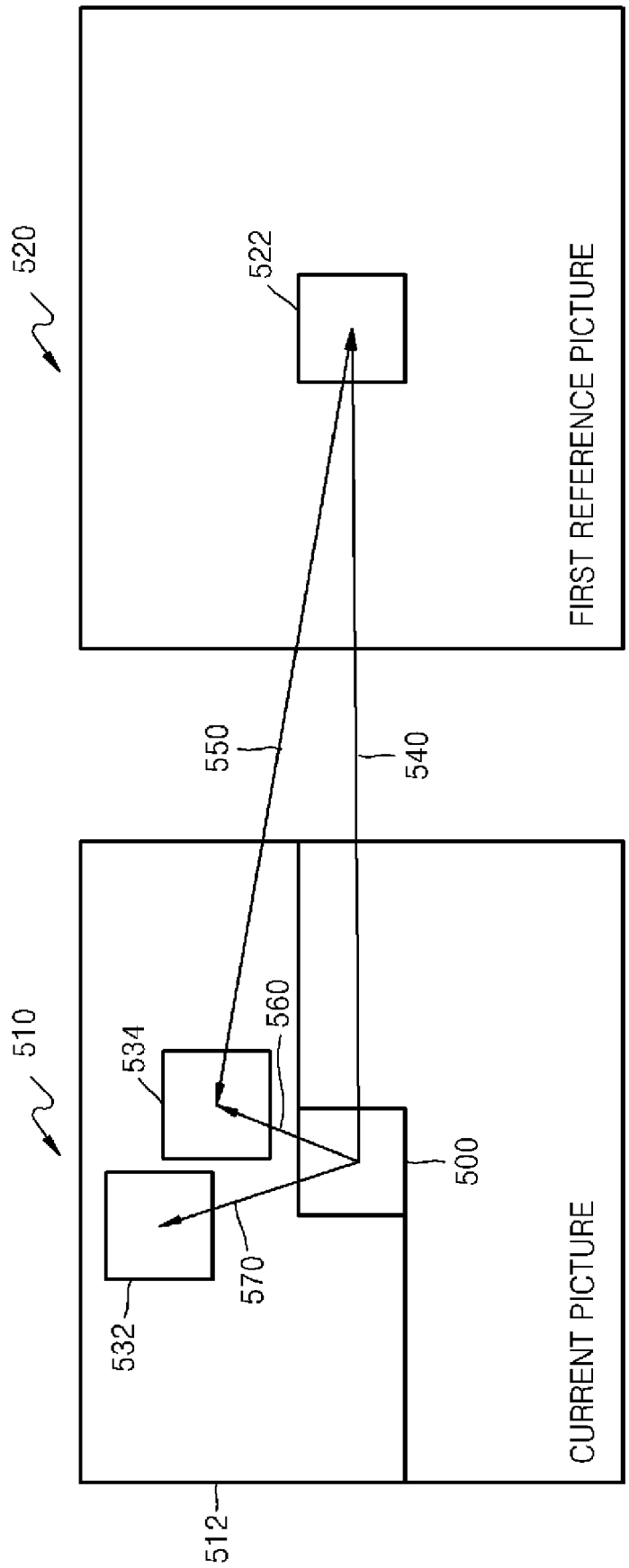
FIG. 5A illustrates a prediction method according to another exemplary embodiment of the present invention.

FIG. 5A illustrates a prediction method according to another exemplary embodiment of the present invention. Specifically, FIG. 5A illustrates predicting a current block 500 of a current picture 510 by performing continuous motion estimation.

The predicting unit 210 searches a first reference picture 520 so as to predict the current block 500 and to generate a first prediction block 522. As a result of first motion estimation, a first motion vector 540 is generated.

Then, by performing continuous motion estimation, the predicting unit 210 searches a previously encoded region 512 of the current picture 510 by using the first prediction block 522 to generate a second prediction block 534. As a result of second motion estimation, a second motion vector 550 is generated. As described previously with respect to FIG. 3, the second motion vector 550 does not need to be additionally encoded.

However, unlike in FIG. 3, the previously encoded region 512 of the current picture 510 is searched directly by using the current block 500 to generate a third prediction block 532.

According to the related art, the third prediction block 532 is searched directly by using the current block 500, and when a motion vector indicating a relative position difference between the current block 500 and the third prediction block 532 is additionally encoded, a motion vector that represents a position difference between blocks inside a picture is not easily predicted, and thus the compression rate of encoding is lowered. However, in the prediction method of FIG. 5A, a motion vector 560 regarding the second prediction block 534 is used as a prediction motion vector of a motion vector 570 regarding the third prediction block 532 so that the compression rate of encoding is improved.

The predicting unit 210 generates a final prediction block of the current block 500 using at least one of the first prediction block 522, the second prediction block 534, and the third prediction block 532. The first prediction block 522, the second prediction block 534, or the third prediction block 532 may also be a final prediction block. Alternatively, a final prediction block may be generated by calculating weights of the first prediction block 522, the second prediction block 534, and the third prediction block 532. The third prediction block 532 may be used as a final prediction block of the current block 500.

Referring back to FIG. 2, the subtracting unit 220 subtracts the final prediction block of the current block 500 generated by the predicting unit 210 from the current block 500 to generate a residual block. In other words, the residual block is generated by subtracting the final prediction block as described previously with respect to FIGS. 3, 4, and 5A from the current block 500.

The encoding unit 230 encodes the residual block generated by the subtracting unit 220. Discrete cosine transformation (DCT) is performed on the residual block to generate discrete cosine coefficients and to quantize the generated discrete cosine coefficients. Then, the quantized discrete cosine coefficients are entropy encoded to generate bistreams.

The encoding unit 230 encodes motion vectors that are generated as a result of motion estimation of the current block 300, 400 or 500.

Firstly, when the predicting unit 210 predicts the current block 300 using the prediction method shown in FIG. 3, the encoding unit 230 encodes only the first motion vector 330. When the first prediction block 322 of the first reference picture 320 is generated by the first motion vector 330, since the second prediction block 316 may be searched using the first prediction block 322, the encoding unit 230 encodes only the first motion vector 330. Even when the current block 400 is predicted using the prediction method of FIG. 4, the encoding unit 230 encodes only the first motion vector 440.

Figure 5B:
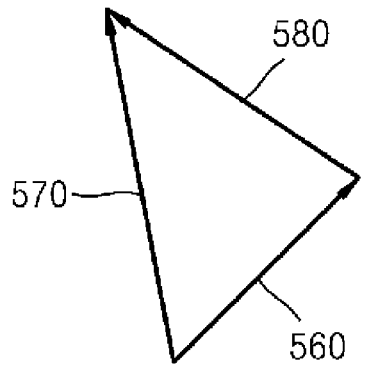
FIG. 5B illustrates a difference vector between motion vectors according to an exemplary embodiment of the present invention.

Next, when the predicting unit 210 predicts the current block 500 by using the prediction method shown in FIG. 5A, the encoding unit 230 encodes a difference vector between a motion vector 560, regarding the second prediction block 534, and a motion vector 570, regarding the third prediction block 532, as well as the first motion vector 540. When the first prediction block 522 is generated by the first motion vector 540, the second prediction block 534 may be searched for by using the first prediction block 522. Thus, since the motion vector 560 regarding the second prediction block 534 can be calculated, the encoding unit 230 encodes a difference vector 580 between the motion vector 560, regarding the second prediction block 534, and the motion vector 570, regarding the third prediction block 532, as illustrated in FIG. 5B.

The restoring unit 240 inverse quantizes and performs inverse discrete cosine transformation (IDCT) on the discrete cosine coefficients quantized by the encoding unit 230 to restore a residual block. Then, the restoring unit 240 restores the current block 500 by adding the final prediction block generated by the predicting unit 210 to the restored residual block. The restored current block 500 is restored in the frame memory 250 and is used to predict a next block or a next picture.

Figure 6:
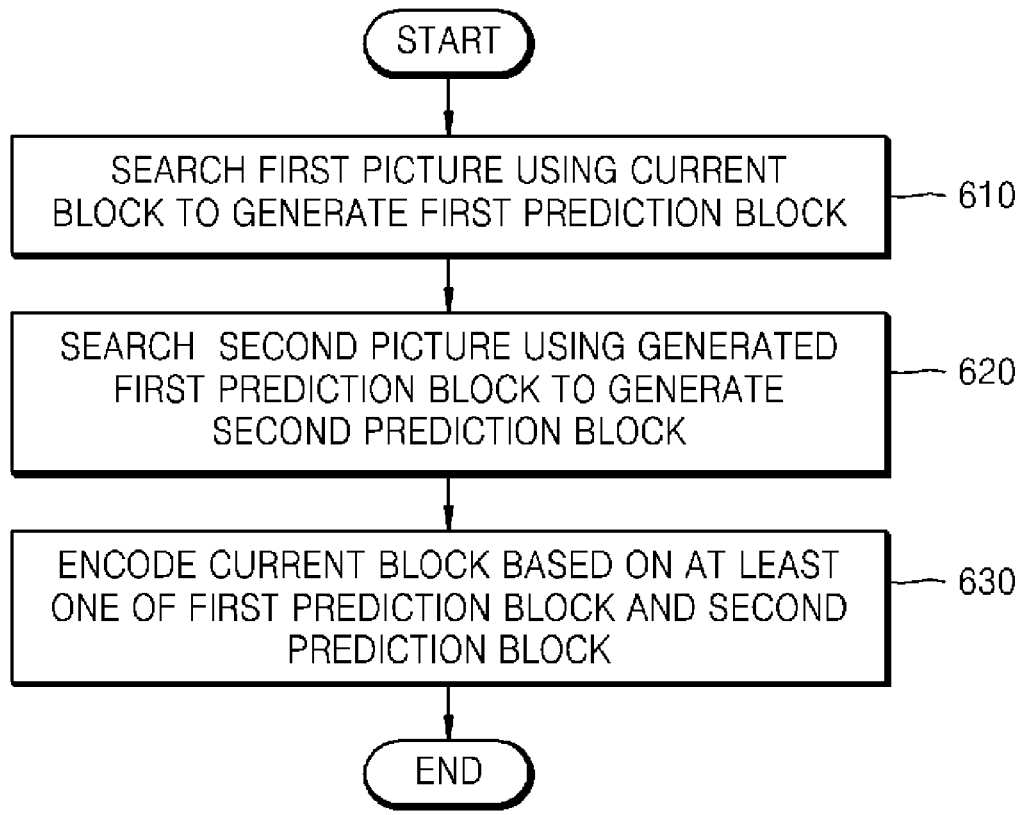
FIG. 6 is a flowchart of a method of encoding an image according to an exemplary embodiment of the present invention.

FIG. 6 is a flowchart illustrating a method of encoding an image according to an exemplary embodiment of the present invention. Specifically, FIG. 6 illustrates a method of predicting and encoding a current block using the methods of FIGS. 3 and 4. Operations 610 and 620 are operations of performing continuous motion estimation, and generating a prediction block of a current block.

In operation 610, an apparatus for encoding an image according to an exemplary embodiment of the present invention searches for a first reference picture using a current block to generate a first prediction block. Like in the conventional motion estimation method, a first prediction block having the smallest SAD with the current block is searched for in the first reference picture.

In operation 620, the apparatus searches a second reference picture by using the first prediction block generated in operation 610 to generate a second prediction block. Specifically, motion estimation is performed using the first prediction block of the first reference picture and generates a second prediction block. The second reference picture may be a current picture. In this case, a previously encoded region of the current picture is searched for so that the second prediction block is generated. The second reference picture may also be a picture different from the current picture.

In operation 630, the apparatus encodes the current block based on at least one of the first prediction block and the second prediction block. The first prediction block, the second prediction block, or a block that is generated by calculating weights of the first prediction block and the second prediction block, is a final prediction block of the current block.

The final prediction block is subtracted from the current block to generate a residual block, and DCT is performed on the generated residual block, and the residual block is then quantized, and entropy encoded to generate a bitstream. A motion vector for continuous motion estimation of the current block is also encoded, and a motion vector for the first prediction block, i.e. only the first motion vector 330 or 440, is encoded.

Figure 7:
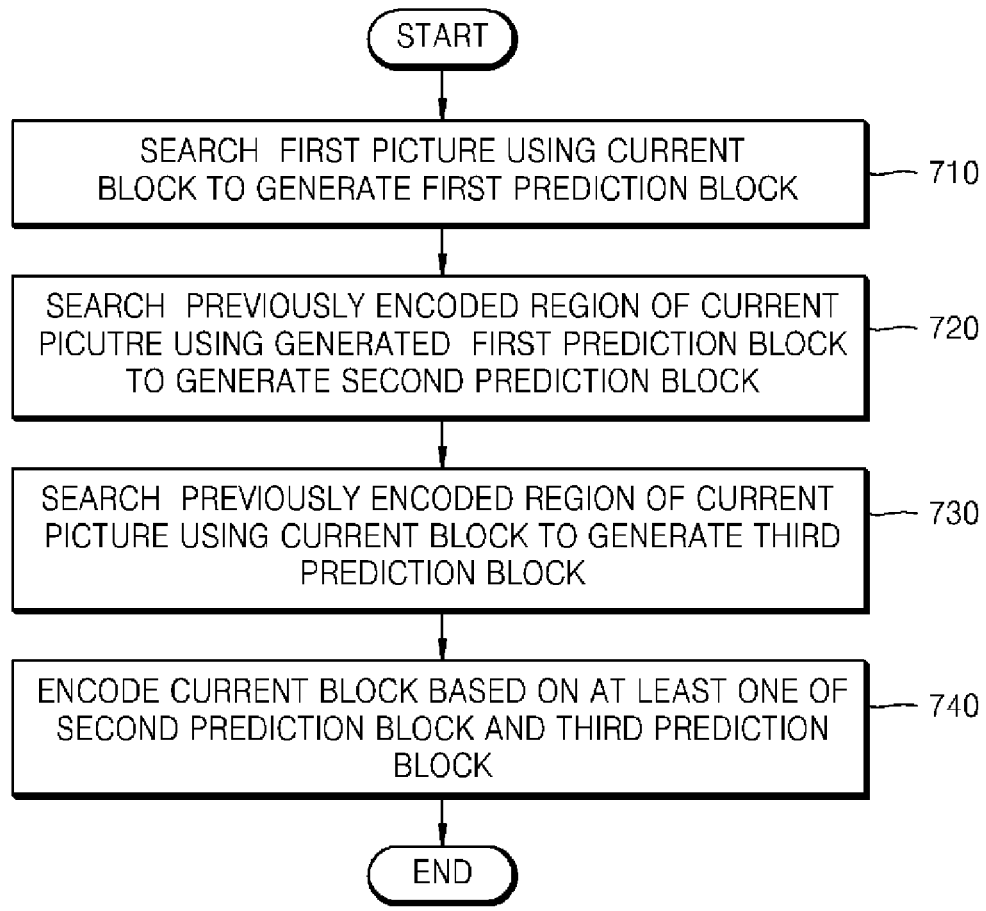
FIG. 7 is a flowchart of a method of encoding an image according to another exemplary embodiment of the present invention.

FIG. 7 is a flowchart illustrating a method of encoding an image according to another exemplary embodiment of the present invention. Specifically, FIG. 7 illustrates a method of predicting and encoding a current block according to the method shown in FIG. 5A. Operations 710 through 730 are operations of performing continuous motion estimation, and generating a prediction block of the current block.

In operation 710, the apparatus searches a first reference picture using the current block to generate a first prediction block. Operation 710 is the same operation as operation 610.

In operation 720, the apparatus searches a previously encoded region of a current picture by using the first prediction block generated in operation 710 to generate a second prediction block. A block having a minimum SAD with the first prediction block is searched for in the previously encoded region of the current picture. Operation 720 is the same operation as operation 620.

In operation 730, the apparatus searches the previously encoded region of the current picture by using the current block to generate a third prediction block. In operation 720, the previously encoded region of the current picture is searched using the first prediction block. However, in operation 730, the previously encoded region of the current picture is searched for by using the current block. However, a large number of bits are used to encode a motion vector regarding the third prediction block so that the compression rate of image encoding is lowered. Thus, the present invention solves the problem by using a motion vector regarding the second prediction block as a prediction motion vector of the motion vector regarding the third prediction block.

In operation 740, the apparatus encodes the current block based on at least one of the second prediction block and the third prediction block. The apparatus subtracts the third prediction block from the current block and generates a residual block. The apparatus performs DCT, quantizes, and entropy encodes the generated residual block to generate a bitstream. Alternatively, a block that is generated by calculating weights of the second prediction block and the third prediction block may be used as final prediction block.

The apparatus encodes a motion vector regarding the first prediction block which is a motion vector for continuous motion estimation of the current block, i.e. the first motion vector 540. The apparatus encodes a difference vector 580 between the second motion vector 560 and the third motion vector 570, as well as the first motion vector so that a decoding side uses the third prediction block 532 as a final prediction block.

Figure 8:
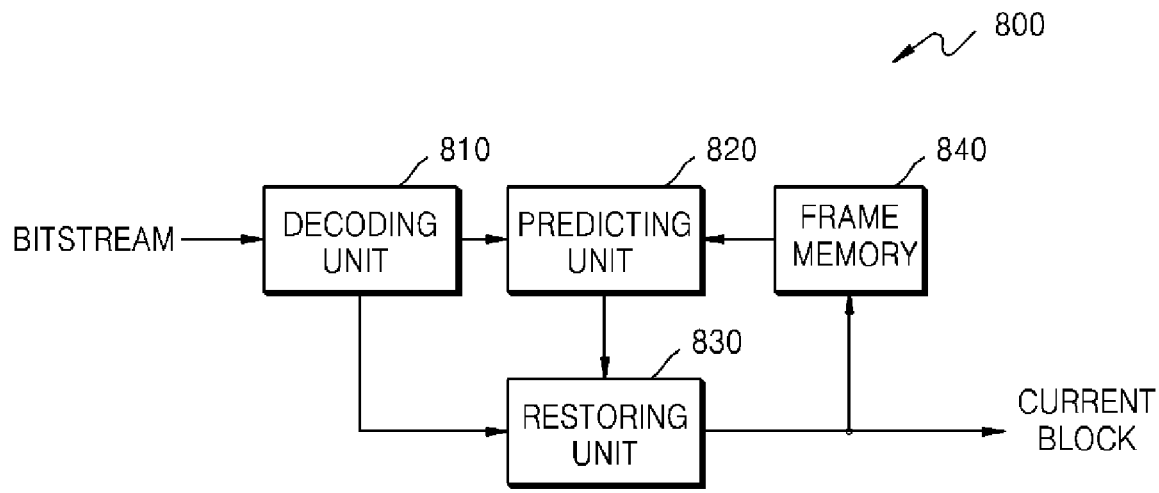
FIG. 8 is a block diagram of an apparatus for decoding an image according to an exemplary embodiment of the present invention.

FIG. 8 is a block diagram of an apparatus for decoding an image according to an exemplary embodiment of the present invention. Referring to FIG. 8, an apparatus 800 for decoding an image according to an exemplary embodiment of the present invention comprises a decoding unit 810, a predicting unit 820, a restoring unit 830, and a frame memory 840.

The decoding unit 810 receives a bitstream including data regarding a current block and restores a residual block from the received bitstream. The decoding unit 810 entropy decodes data regarding the current block, restores quantized discrete cosine coefficients, inverse quantizes and performs IDCT on the quantized discrete cosine coefficients, and restores the residual block.

The decoding unit 810 also decodes a motion vector for the current block, i.e. a motion vector for continuous motion estimation of the current block. When the current block is prediction encoded by performing continuous motion estimation according to the prediction method shown in FIG. 3 or 4, the decoding unit 810 decodes only a first motion vector 330 or 440. However, when the current block is prediction encoded by performing continuous motion estimation according to the prediction method shown in FIG. 5A, the decoding unit 810 decodes a difference vector 580 between a motion vector 560 regarding a second prediction block and a motion vector regarding a third prediction block, as well as a first motion vector 540.

The predicting unit 820 predicts the current block by performing continuous motion prediction based on a motion vector of the current block decoded by the decoding unit 810.

In an exemplary embodiment of the present invention, the predicting unit 820 generates a first prediction block of a first reference picture by using the first motion vector 330 or 440 decoded by the decoding unit 810, as illustrated in FIG. 3 or 4, searches a previously decoded region of the current picture or a picture different from the current picture by using the generated first prediction block, and generates a second prediction block. Then, the predicting unit 820 may search the third prediction block in the previously decoded region of the current picture by using the difference vector 580. In this case, the third prediction block or a block that is generated by calculating weights of the second prediction block and the third prediction block may be a final prediction block of the current block.

The restoring unit 830 restores the current block based on the final prediction block generated by the predicting unit 820. The restoring unit 830 adds the final prediction block generated by the predicting unit 820, by using continuous motion estimation, to the residual block restored by the decoding unit 810, and restores the current block. The restored current block is stored in the frame memory 840 and is used to predict a next block or a next picture.

Figure 9:
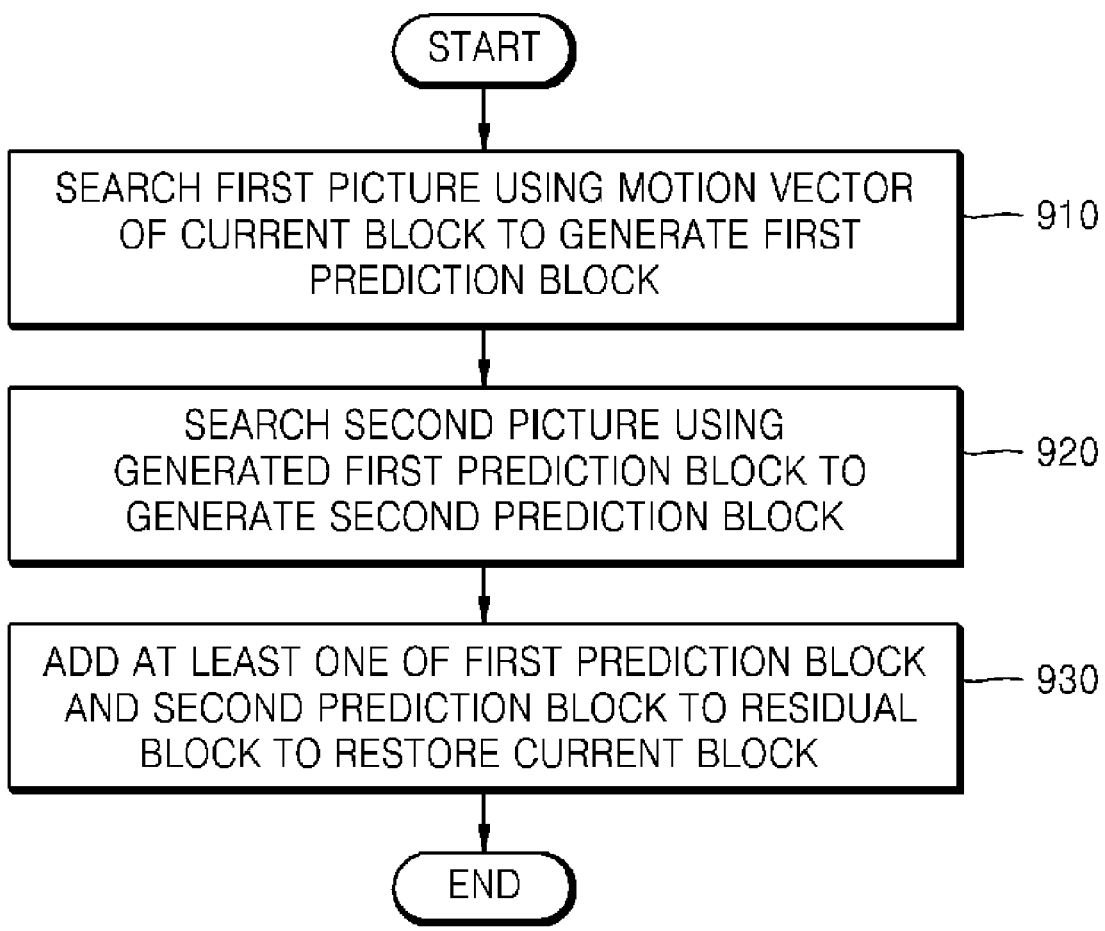
FIG. 9 is a flowchart of a method of decoding an image according to an exemplary embodiment of the present invention.

FIG. 9 is a flowchart illustrating a method of decoding an image according to an exemplary embodiment of the present invention. Specifically, FIG. 9 illustrates a method of prediction decoding a current block by using the continuous motion estimation shown in FIG. 3 or 4.

Operations 910 and 920 are operations of generating a prediction block of the current block by using continuous motion estimation.

In operation 910, the apparatus for decoding an image according to an exemplary embodiment of the present invention searches for a first reference picture by using a motion vector of a current block to generate a first prediction block. The apparatus generates the first prediction block by using a first motion vector 330 or 440 of the current block included in data regarding the current block.

In operation 920, the apparatus for decoding an image searches a previously decoded region of a current picture, or a picture different from the current picture, by using the first prediction block generated in operation 910 to generate a second prediction block. If the current block is encoded using the prediction method shown in FIG. 3, the apparatus searches the previously decoded region of the current picture, and if the current block is encoded using the prediction method shown in FIG. 4, the apparatus searches the picture different from the current picture to generate a second prediction block.

In operation 930, the apparatus for decoding an image adds at least one of the first prediction block and the second prediction block to a residual block, and restores the current block. The apparatus adds the first prediction block or the second prediction block and a block generated by calculating weights of the first prediction block and the second prediction block to the residual block and restores the current block. The residual block is restored by decoding data regarding the current block included in a bitstream.

Figure 10:
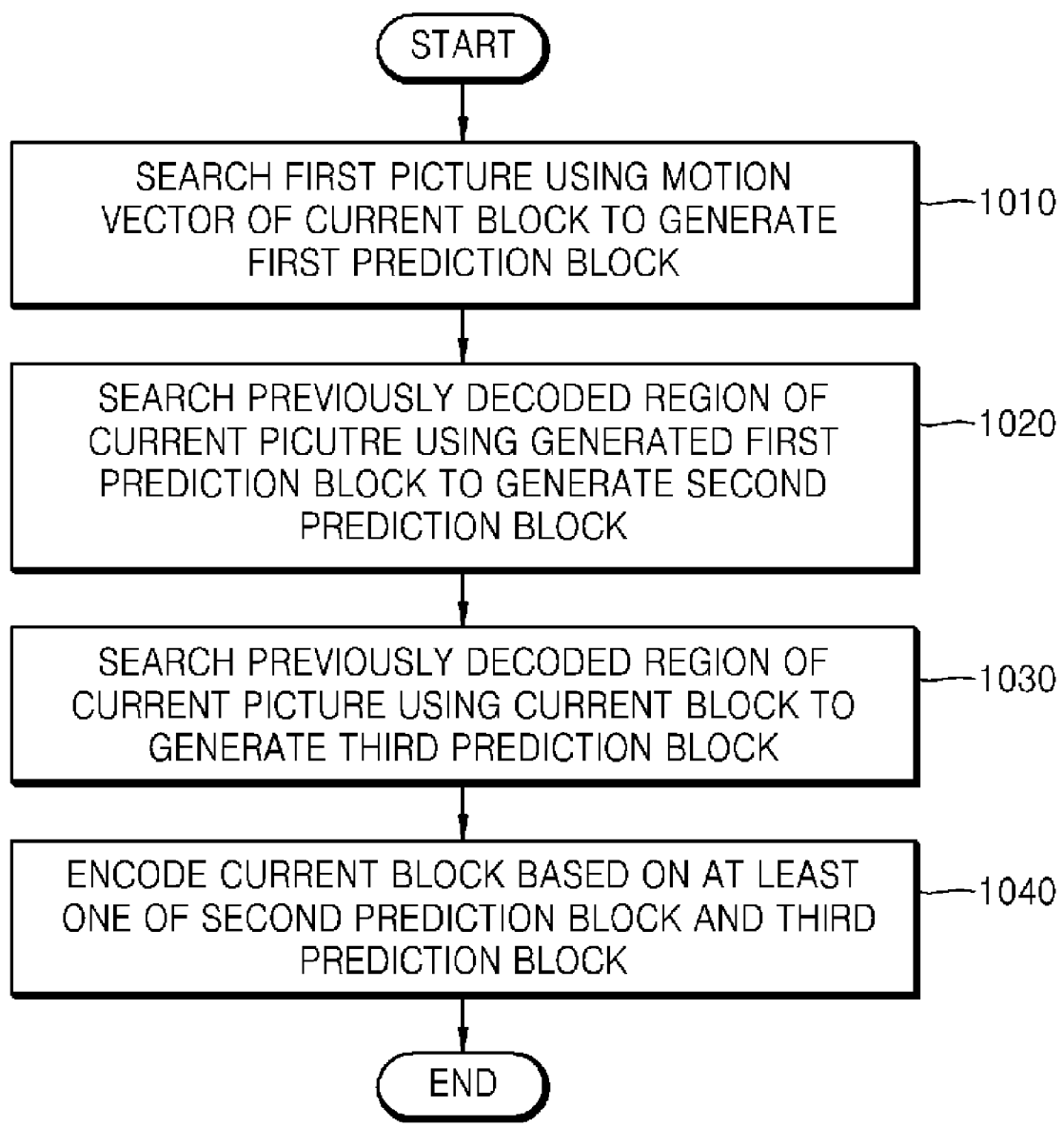
FIG. 10 is a flowchart of a method of decoding an image according to another exemplary embodiment of the present invention.

FIG. 10 is a flowchart illustrating a method of decoding an image according to another exemplary embodiment of the present invention. Specifically, FIG. 10 illustrates a method of prediction decoding a current block by using the continuous motion estimation shown in FIG. 5A.

Operations 1010 through 1030 illustrate operations of generating a prediction block of the current block by using continuous motion estimation.

In operation 1010, the apparatus for decoding an image according to an exemplary embodiment of the present invention searches a first reference picture by using a motion vector of the current block to generate a first prediction block. The apparatus decodes the first motion vector 540 included in data regarding the current block and generates the first prediction block according to the decoded first motion vector 540.

In operation 1020, the apparatus searches a previously decoded region of a current picture by using the first prediction block generated in operation 1010 to generate a second prediction block. In order to generate a second motion vector regarding the second prediction block, the apparatus searches a second prediction block in a previously decoded region of the current picture.

In operation 1030, the apparatus searches the previously decoded region of the current picture, by using a difference vector 580 between a motion vector 560 regarding the second prediction block and a motion vector 570 regarding the third prediction block, to generate a third prediction block. If the apparatus adds a difference vector with the second motion vector 560 regarding the second prediction block generated in operation 1020, a third motion vector 570 regarding the third prediction block is generated. The apparatus generates the third prediction block by using the third motion vector 570.

In operation 1040, the apparatus encodes the current block based on at least one of the second prediction block and the third prediction block.

The invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In an alternate embodiment, the computer readable recording medium may be carrier waves (such as data transmission through the Internet). The computer readable recording medium may also be distributed over network coupled computer systems so that the computer readable code is stored and executed in a distributed fashion.

According to the present invention, a current block can be predicted more precisely from a plurality of reference pictures by performing consecutive motion estimation without encoding additional information. Thus, the current block is encoded based on more precise prediction and the compression rate of image encoding is improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, the method comprising:
    searching, by a computer, a first reference picture using a current block of a current picture and generating, by the computer, a first prediction block based on a result of the searching the first reference picture;
    searching a second reference picture using the generated first prediction block and generating a second prediction block based on a result of the searching the second reference picture; and
    encoding the current block based on at least one of the first prediction block and the second prediction block.

2. The method of claim 1, wherein the generating of the second prediction block comprises searching a previously encoded region of the current picture using the generated first prediction block to generate the second prediction block.

3. The method of claim 1, wherein the generating of the second prediction block comprises searching a picture different from the current picture using the generated first prediction block to generate the second prediction block.

4. The method of claim 1, wherein the encoding of the current block comprises:
    subtracting at least one of the first prediction block and the second prediction block from the current block to generate a residual block of the current block; and
    encoding the residual block and a motion vector that is generated based on motion estimation of the first prediction block.

5. The method of claim 4, wherein the generating of the residual block comprises subtracting a third prediction block from the current block, the third prediction block generated based on weights of the first prediction block and the second prediction block.

6. A method of decoding an image, the method comprising:
    searching, by a computer, a first reference picture using a motion vector of a current block of a current picture and generating, by the computer, a first prediction block based on a result of the searching the first reference picture;
    searching a second reference picture using the generated first prediction block and generating a second prediction block based on a result of the searching the second reference picture; and
    restoring the current block by adding at least one of the first prediction block and the second prediction block to a residual block of the current block.

7. The method of claim 6, wherein the generating of the second prediction block comprises searching a previously decoded region of the current picture using the generated first prediction block to generate the second prediction block.

8. The method of claim 6, wherein the generating of the second prediction block comprises searching a picture different from the current picture using the generated first prediction block to generate the second prediction block.

9. The method of claim 6, wherein the restoring of the current block comprises adding the residual block to a third prediction block, the third predication block generated based on weights of the first prediction block and the second prediction block.

10. A method of encoding an image, the method comprising:
    searching, by a computer, a first reference picture using a current block of a current picture and generating, by the computer, a first prediction block based on a result of the searching;
    searching a previously encoded region of the current picture using the generated first prediction block and generating a second prediction block based on a result of the searching the previously encoded region using the generated first prediction block;
    searching the previously encoded region of the current picture using the current block and generating a third prediction block based on a result of the searching the previously encoded region using the current block; and
    encoding the current block based on at least one of the second prediction block and the third prediction block.

11. The method of claim 10, wherein the encoding of the current block comprises:
    subtracting the third prediction block from the current block to generate a residual block of the current block; and
    encoding the residual block, a motion vector that is generated based on motion estimation of the first prediction block, and a difference vector between a motion vector that is generated based on motion estimation of the second prediction block and a motion vector that is generated based on motion estimation of the third prediction block.

12. A method of decoding an image, the method comprising:
- searching, by a computer, a first reference picture using a motion vector of a current block of a current picture and generating, by the computer, a first prediction block based on the results of the searching the first reference picture;
- searching a previously decoded region of the current picture using the generated first prediction block and generating a second prediction block based on the results of searching the previously decoded region of the current picture using the generated first prediction block;
- searching the previously decoded region of the current picture using a difference vector between a motion vector that is generated based on motion estimation of the second prediction block and a motion vector that is generated based on motion estimation of a third prediction block and generating the third prediction block based on a result of the searching the previously decoded region of the current picture using the difference vector; and
- restoring the current block by adding the third prediction block to a residual block of the current block.

13. An apparatus for encoding an image, the apparatus comprising:
- a predicting unit that searches a first reference picture using a current block of a current picture to generate a first prediction block and that searches a second reference picture using the generated first prediction block to generate a second prediction block; and
- an encoding unit that encodes the current block based on at least one of the generated first prediction block and the generated second prediction block.

14. The apparatus of claim 13, wherein the predicting unit searches a previously encoded region of the current picture using the generated first prediction block to generate the second prediction block.

15. The apparatus of claim 13, wherein the predicting unit searches a picture different from the current picture using the generated first prediction block to generate the second prediction block.

16. The apparatus of claim 13, wherein the encoding unit subtracts at least one of the first prediction block and the second prediction block from the current block to generate a residual block of the current block, and the encoding unit encodes the generated residual block and a motion vector that is generated based on motion estimation of the first prediction block.

17. The apparatus of claim 16, wherein the residual block is a residual block that is generated by subtracting a third prediction block from the current block, the third prediction block generated based on weights of the first prediction block and the second prediction block.

18. An apparatus for decoding an image, the apparatus comprising:
- a predicting unit that searches a first reference picture using a motion vector of a current block of a current picture to generate a first prediction block and that searches a second reference picture using the generated first prediction block to generate a second prediction block; and
- a restoring unit that restores the current block by adding at least one of the first prediction block and the second prediction block to a residual block of the current block.

19. The apparatus of claim 18, wherein the predicting unit searches a previously decoded region of a current picture using the generated first prediction block to generate the second prediction block.

20. The apparatus of claim 18, wherein the predicting unit searches a picture different from the current picture using the generated first prediction block to generate the second prediction block.

21. The apparatus of claim 18, wherein the restoring unit adds the residual block to a third prediction block to restore the current block, the third prediction block generated based on weights of the first prediction block and the second prediction block.

22. An apparatus for encoding an image, the apparatus comprising:
- a predicting unit that searches a first reference picture by using a current block of a current picture to generate a first prediction block, that searches a previously encoded region of the current picture using the generated first prediction block to generate a second prediction block, and that searches the previously encoded region of the current picture using the current block to generate a third prediction block; and
- an encoding unit that encodes the current block based on at least one of the second prediction block and the third prediction block.

23. The apparatus of claim 22, wherein the encoding unit encodes a residual block of the current block generated by subtracting the third prediction block from the current block, a motion vector that is generated based on motion estimation of the first prediction block, and a difference vector between a motion vector that is generated based on motion estimation of the second prediction block and a motion vector that is generated based on motion estimation of the third prediction block.

24. An apparatus for decoding an image, the apparatus comprising:
- a predicting unit that searches a first reference picture using a motion vector of a current block of a current picture to generate a first prediction block, that searches a previously decoded region of the current picture using the generated first prediction block to generate a second prediction block, and that searches the previously decoded region of the current picture using a difference vector between a motion vector that is generated based on motion estimation of the second prediction block and a motion vector that is generated based on motion estimation of the third prediction block to generate a third prediction block; and
- a restoring unit that restores the current block by adding the third prediction block to a residual block of the current block.

25. A tangible non-transitory computer readable recording medium having embodied thereon a program that causes a computer to execute a method of encoding an image the method comprising:
- searching a first reference picture using a current block of a current picture and generating a first prediction block based on a result of the searching the first reference picture;
- searching a second reference picture using the generated first prediction block and generating a second prediction block based on a result of the searching the second reference picture; and encoding the current block based on at least one of the first prediction block and the second prediction block.

26. A tangible non-transitory computer readable recording medium having embodied thereon a program that causes a computer to execute a method of decoding an image, the method comprising:

searching a first reference picture using a motion vector of a current block of a current picture and generating a first prediction block based on a result of the searching the first reference picture;

searching a second reference picture using the generated first prediction block and generating a second prediction block based on a result of the searching the second reference picture; and restoring the current block by adding at least one of the first prediction block and the second prediction block to a residual block of the current block.

27. A tangible non-transitory computer readable recording medium having embodied thereon a program that causes a computer to execute a method of encoding an image, the method comprising:

searching a first reference picture using a current block of a current picture and generating a first prediction block based on a result of the searching;

searching a previously encoded region of the current picture using the generated first prediction block and generating a second prediction block based on a result of the searching the previously encoded region using the generated first prediction block;

searching the previously encoded region of the current picture using the current block and generating a third prediction block based on a result of the searching the previously encoded region using the current block; and encoding the current block based on at least one of the second prediction block and the third prediction block.

28. A tangible non-transitory computer readable recording medium having embodied thereon a program that causes a computer to execute a method of decoding an image, the method comprising:

searching a first reference picture using a motion vector of a current block of a current picture and generating a first prediction block based on the results of the searching the first reference picture;

searching a previously decoded region of the current picture using the generated first prediction block and generating a second prediction block based on the results of searching the previously decoded region of the current picture using the generated first prediction block;

searching the previously decoded region of the current picture using a difference vector between a motion vector that is generated based on motion estimation of the second prediction block and a motion vector that is generated based on motion estimation of a third prediction block and generating the third prediction block based on a result of the searching the previously decoded region of the current picture using the difference vector; and adding the third prediction block to a residual block of the current block to restore the current block.

* * * * *